US006784570B1

(12) United States Patent
Walls et al.

(10) Patent No.: US 6,784,570 B1
(45) Date of Patent: Aug. 31, 2004

(54) INTEGRATED POWER SUPPLY AND PLATFORM FOR MILITARY RADIO

(75) Inventors: Robert Allen Walls, Madison, AL (US); Michael Samuel Hamilton, Huntsville, AL (US); Kenneth Wayne Arnold, Huntsville, AL (US); Hubert Sims, Jr., Huntsville, AL (US)

(73) Assignee: Perkins Technical Services, Inc., Huntsville, AL (US)

( * ) Notice: Subject to any disclaimer, the term of this patent is extended or adjusted under 35 U.S.C. 154(b) by 138 days.

(21) Appl. No.: 10/017,411

(22) Filed: Dec. 14, 2001

(51) Int. Cl.[7] .................................................. H02J 7/00
(52) U.S. Cl. ...................................... 307/150; 320/107
(58) Field of Search ................................. 320/107–115; 307/43, 64, 150; 439/131, 119; 710/303

(56) References Cited

U.S. PATENT DOCUMENTS

| 5,604,663 A | * | 2/1997 | Shin et al. ................... 361/686 |
| 5,611,701 A | * | 3/1997 | Hahn .......................... 439/131 |
| 5,627,450 A | | 5/1997 | Ryan et al. .................... 320/15 |
| 5,687,061 A | * | 11/1997 | Mesfin et al. ................ 361/686 |
| 6,040,681 A | * | 3/2000 | May ............................ 320/113 |
| 6,163,086 A | * | 12/2000 | Choo ........................... 307/43 |
| 6,191,553 B1 | | 2/2001 | Feng-Jung ................... 320/113 |
| 6,309,230 B2 | * | 10/2001 | Helot .......................... 439/131 |
| 6,341,218 B1 | * | 1/2002 | Poplawsky et al. ...... 455/569.1 |
| 6,453,378 B1 | * | 9/2002 | Olson et al. ................. 710/304 |
| 6,491,278 B1 | * | 12/2002 | Thomsen .................... 248/460 |
| 6,604,199 B1 | * | 8/2003 | Yang et al. .................. 713/300 |

* cited by examiner

Primary Examiner—Gregory J. Toatley, Jr.
(74) Attorney, Agent, or Firm—Russell Carter Gache Sirote & Permutt, P.C.

(57) ABSTRACT

A power supply station is presented having a substantially flat-based portion and a taller rear portion extending upward from the rear of the primary base portion, but being formed integrally therefrom. Dual connectors extend forward from the front surface of the rear portion and are adapted for connecting with recessed male connectors found on the rear sockets of SINCGARS radio. Internal electronics within a unit converts standard 110/220 Volt AC current into a standard +12 Volt DC source compatible with standard SINCGARS radios. The internal electronics provide separate conversion power supplies for both connectors to allow for two SINCGARS radios to be powered simultaneously. The invention also includes switches for controlling the powering of any installed SINCGARS radio as well as low friction runners and retention latches on the front of the unit to allow for secure retention of the SINCGARS radio on the invention while powering.

25 Claims, 5 Drawing Sheets

INTEGRATED POWER SUPPLY AND PLATFORM FOR MILITARY RADIO

FIELD OF THE INVENTION

The present invention relates generally to power supplies and integrated power supply docking stations and platforms. In particular, the present invention relates to integrated power supplies and platforms forming a single physical platform with integrated power electronics.

BACKGROUND OF THE INVENTION

In the early 1990's a new family of VHF-FM combat net radios was adopted by the American military; known as Single Channel Ground and Airborne Radio System, commonly referred to as "SINCGARS." SINCGARS radios were designed to provide the primary means of communications and control for infantry and armored vehicles, and artillery units, all in coordination with naval and air support, and are designed on a modular basis to achieve maximum commonality among the various ground airborne system configurations of the armed forces. The SINCGARS radios have the capability to transmit and receive voice, as well as, tactical data and are consistent with NATO interoperability requirements. SINCGARS systems operate on any of 2320 channels between 30 and 88 megahertz and are designed to survive in a nuclear environment. Communication security ("COMSEC") for SINCGARS are provided by use of the VISON encryption device and are operable in hostile environments for the use of electronic counter measures ("ECCM"). SINCGARS achieve significant reductions in physical space and power supply requirements over the prior versions of standard man pack and vehicular radios.

SINCGARS provide commanders with a highly reliable, secure, easily maintained combat net radios that have both voice and data handling capabilities in support of command and control operations. Together with internet controller capabilities, and communications links to other airborne defense communication centers (e.g. Hawkeye airborne communication centers) multi-task force inter-operability is achieved.

Communications and especially radio communications is the lifeline of the U.S. military forces. SINCGARS radios and their associated equipment are employed to accomplish various communication requirements during unit mission operations and, typically, require man pack or vehicular mounts for mobile utilization. The primary radios utilized by the Armed Forces are receiver transmitter versions RT-1523 through RT-1523E, but other physical configurations exist in the full range of SINCGARS radio models, such as: ground ICOM radios using receiver-transmitter ("RT") RT-1523, RT-1523A, RT-1523B, RT-1523C, RT-1523D, and RT-1523E; receiver-transmitter RT-1523 series AN/VRC-87A/D/F through AN/VRC-92A/D/F and AN/PRC-119 SINCGARS, SINCGARS ASIP.

In a typical peacetime situation, a SINCGARS radio operator will obtain required communications gear from a communications or supply depot. A man pack outfit will usually include a main power battery in addition to the SINCGARS radio components. Vehicular SINCGARS radio outfits may also include a dismount radio, including a main power battery, to enable dismounting and removal of the SINCGARS radio from the vehicle.

Both man pack and dismount configurations require batteries for the main power source and for digital memory retention within the radio itself. Actual battery life varies depending upon storage history, operational environment, communications demand, and functional selections within a radio's features. However, typical battery life is between 11 and 33 hours on a single battery charge, depending upon use load.

The SINCGARS RT-1523 series of radios are designed for the non-technical operator and for ease of operation for functioning in a hyperactive tactical environment. Once a radio had been put into operation and its operator has entered the communications net, there are few requirements for the operator to perform. Nominal input power requirement for a SINCGARS radios are 11–16 volts direct current, which are supplied by rechargeable on-board batteries. A competent communications operator must obviously monitor the battery status of each radio under his or her care and keep the units sufficiently charged for each intended mission so that a radio will not become inoperative during a critical stage of a mission.

However, recharging of SINCGAR'S radio batteries can be inconvenient and even unavailable in some mission applications. Interestingly, the SINCGARS radio is designed such that fairly specialized recharging units are required to recharge their internal batteries. Many mission applications utilizing SINCGARS radios, including training, are well within local proximity of standard 110/220 Volt AC electrical outlets. However, a standard AC electrical outlet is useless to SINCGARS radio without additional specialized recharging equipment, which is fairly bulky. A SINCGARS radio's inability to utilize standard 110/220 Volt AC outlets limits its usefulness, especially in training missions, and can hamper the success of a mission when power duration of internal batteries are stretched and recharging units are not readily available.

Therefore, what is needed is a lightweight, versatile, and inexpensive docking platform for SINCGARS radios that will allow for powering of a SINCGARS radio while utilizing a standard 110/220 Volt AC outlet.

SUMMARY OF THE INVENTION

It is the object of the present invention to provide a relatively inexpensive docking platform for SINCGARS radios that will allow for powering of a SINCGARS radio via connection to a standard 110/220 Volt AC outlet.

In summary, the invention consists of a substantially flat-based portion including a taller rear portion extending upward from the rear of the primary base portion and being formed integrally therefrom. Dual connectors extend forward from the front surface of the rear portion and are adapted for connecting with recessed male connectors found on the rear of a SINCGARS radio. Internal electronics within a unit converts standard 110/220 Volt AC current into +12 Volts DC source, which is standard for SINCGARS radios. The internal electronics provide separate conversion power supplies for both connectors to allow for two SINCGARS radios to be powered simultaneously. The invention also includes switches for controlling the powering of any installed SINCGARS radio as well as low friction runners and retention latches on the front of the unit to allow for secure retention of the SINCGARS radio on the invention while recharging and powering.

Other features, objects and advantages of the present invention will become apparent from a reading of the following description as well as a study of the appended drawings.

BRIEF DESCRIPTION OF THE DRAWINGS

A power supply platform incorporating the features of the invention is depicted in the attached drawings which form a portion of the disclosure and wherein.

DESCRIPTION OF THE PREFERRED EMBODIMENTS

Figure 1:
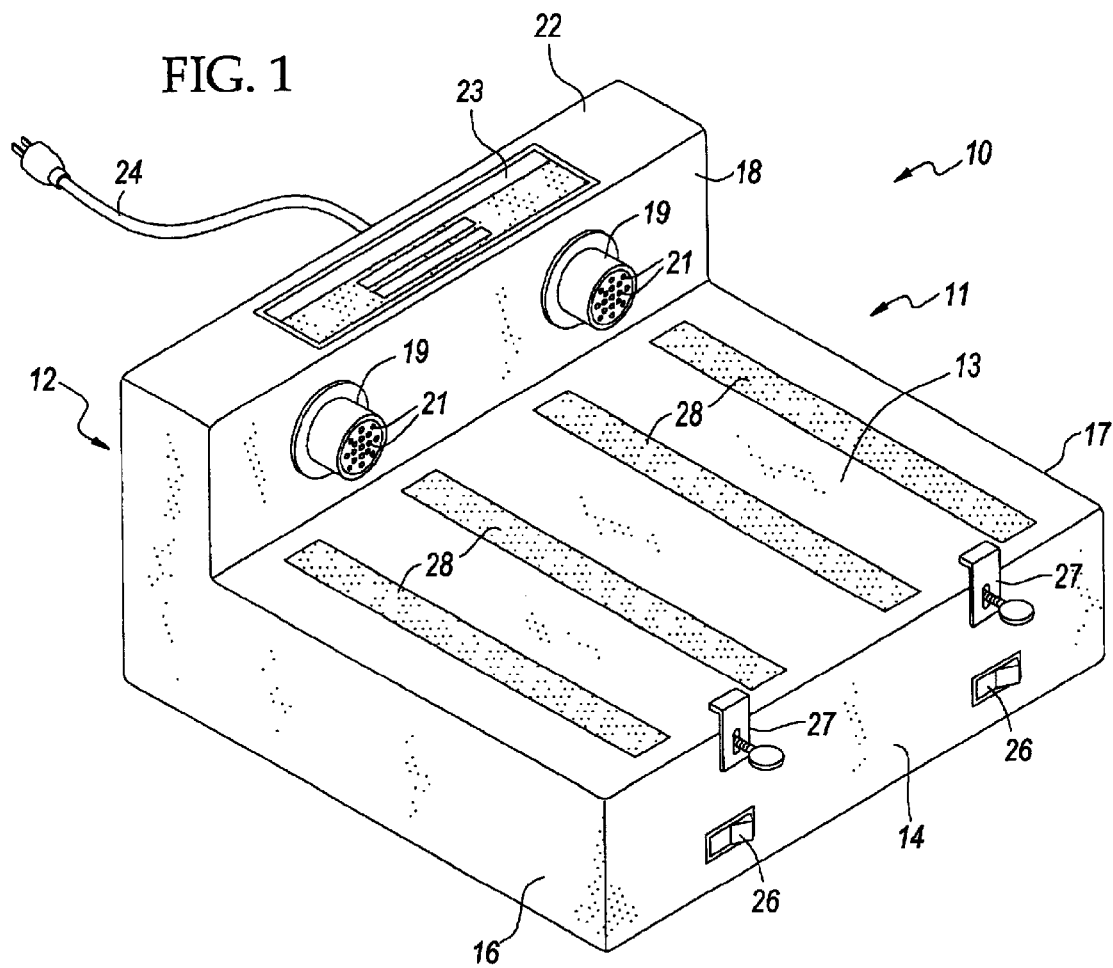
FIG. 1 is a perspective view of the invention showing the dual connectors base platform.
Figure 2:
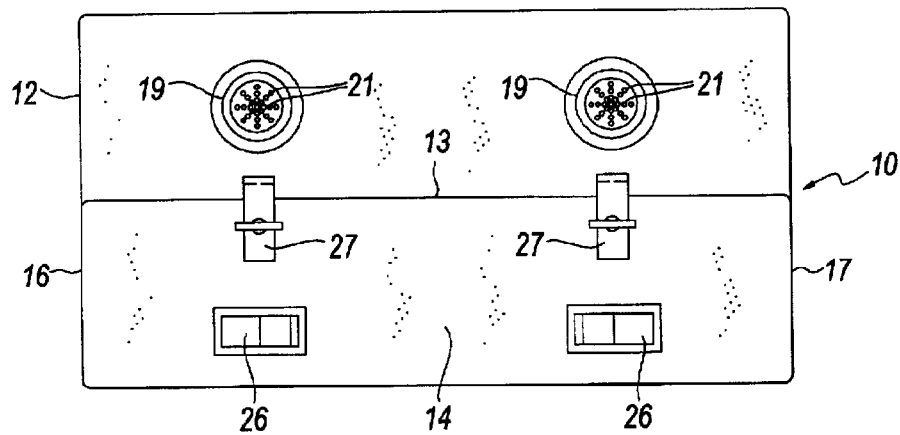
FIG. 2 is a front elevational view of the invention.
Figure 3:
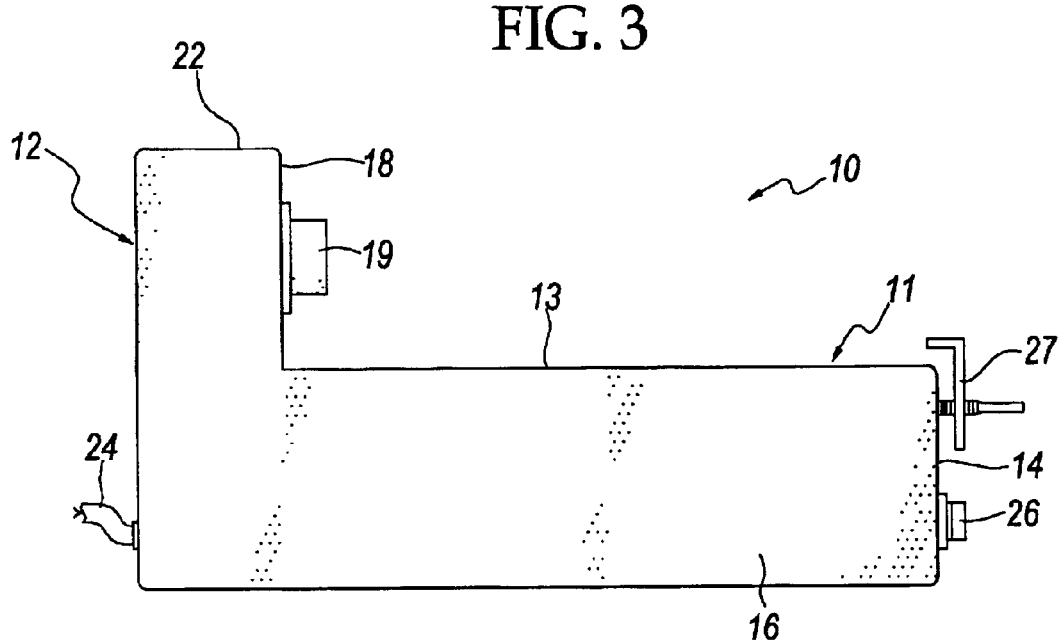
FIG. 3 is a side elevational view of the invention.
Figure 4:
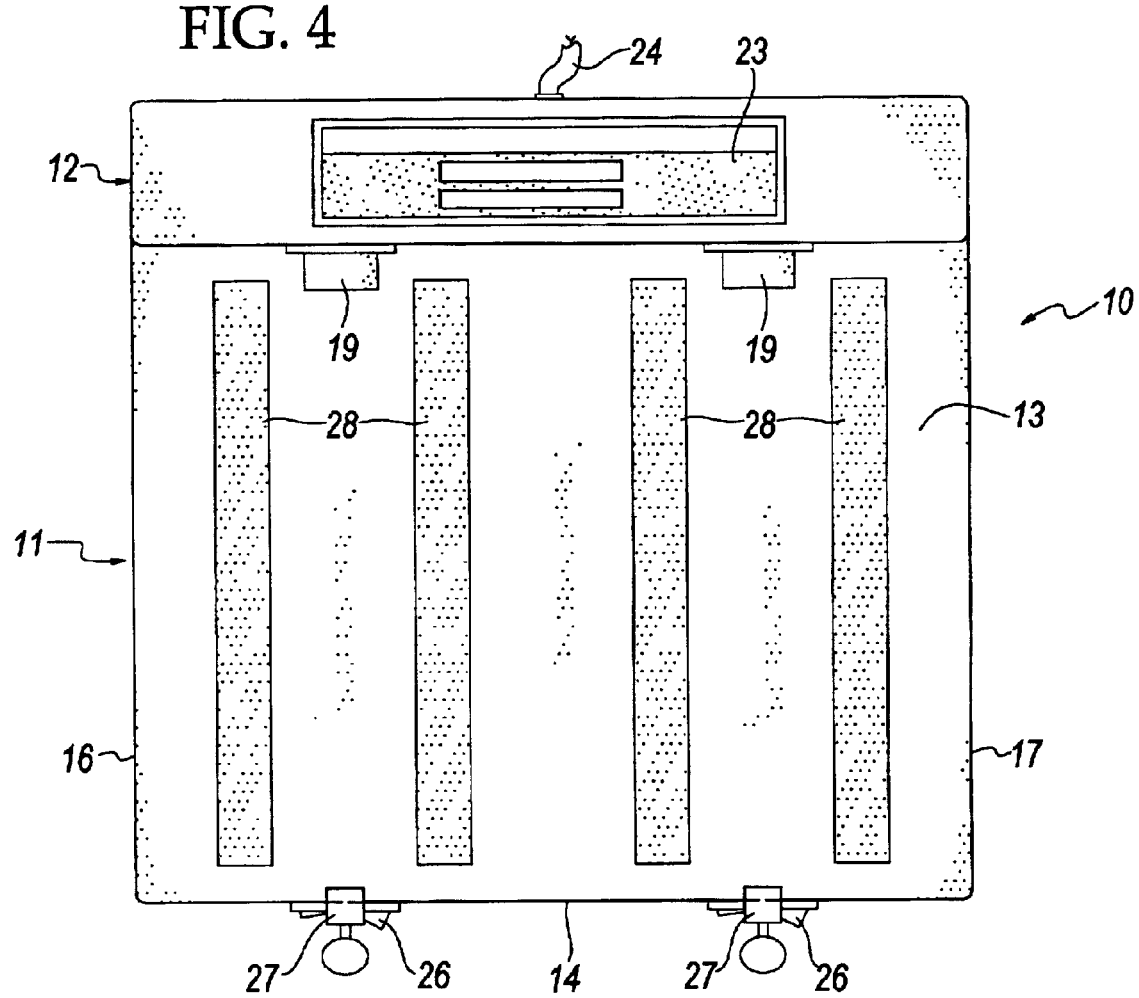
FIG. 4 is a plan view of the invention.

Referring to the drawings for a better understanding of the function and structure of the invention, FIG. 1 shows a perspective view of the preferred embodiment of the invention 10 and FIGS. 2–4 show alternate elevational and plan views. In the preferred embodiment a base platform 11 provides primary support for holding an inserted or docked SINCGARS radio, and a rear portion 12 of the invention extends upward at a 90° angle from the upper surface 13 of the base platform 11. The base platform 11 includes a front side 14 and orthogonally oriented side surfaces 16,17, with both side surfaces extending upward to form the side surface of the rear portion 12, forming an L-shaped surface. A pair of latches 27 are affixed to the front side 14 of the base platform 11 and includes a crimped end for insertion into a corresponding slot on the faceplate or housing of a docked SINCGARS radio to secure the radio onto the platform 11 upon the tightening down of a thumb screw as shown. Two pairs of low friction runners 28 are also applied to the upper surface of the base platform 11 to arrest movement of any installed SINCGARS radios placed on the platform 11.

Electrical connectors 19 are positioned on the forward face of the rear portion of the invention and are positioned to align with a complementary receptor socket on the rear of an installed SINCGARS radio. Receptor contacts 21 are positioned within the connector 19 to receive corresponding male connectors extending within the complementary socket on the rear side of a SINCGARS radio in accordance with government specifications for model numbers RT-1523 through RT-1523E. A labeling plate 23 is positioned on the upper surface 22 of the rear portion in accordance with various military and government standards to provide identifying equipment information.

Control switches 26 allow for initiation of power and/or charging for an installed unit and arc placed on the front side 14 for easy access. A standard power plug 24 extends from the rear surface of the invention (not shown) and plugs into a standard 110/220 Volt household outlet.

Figure 5:
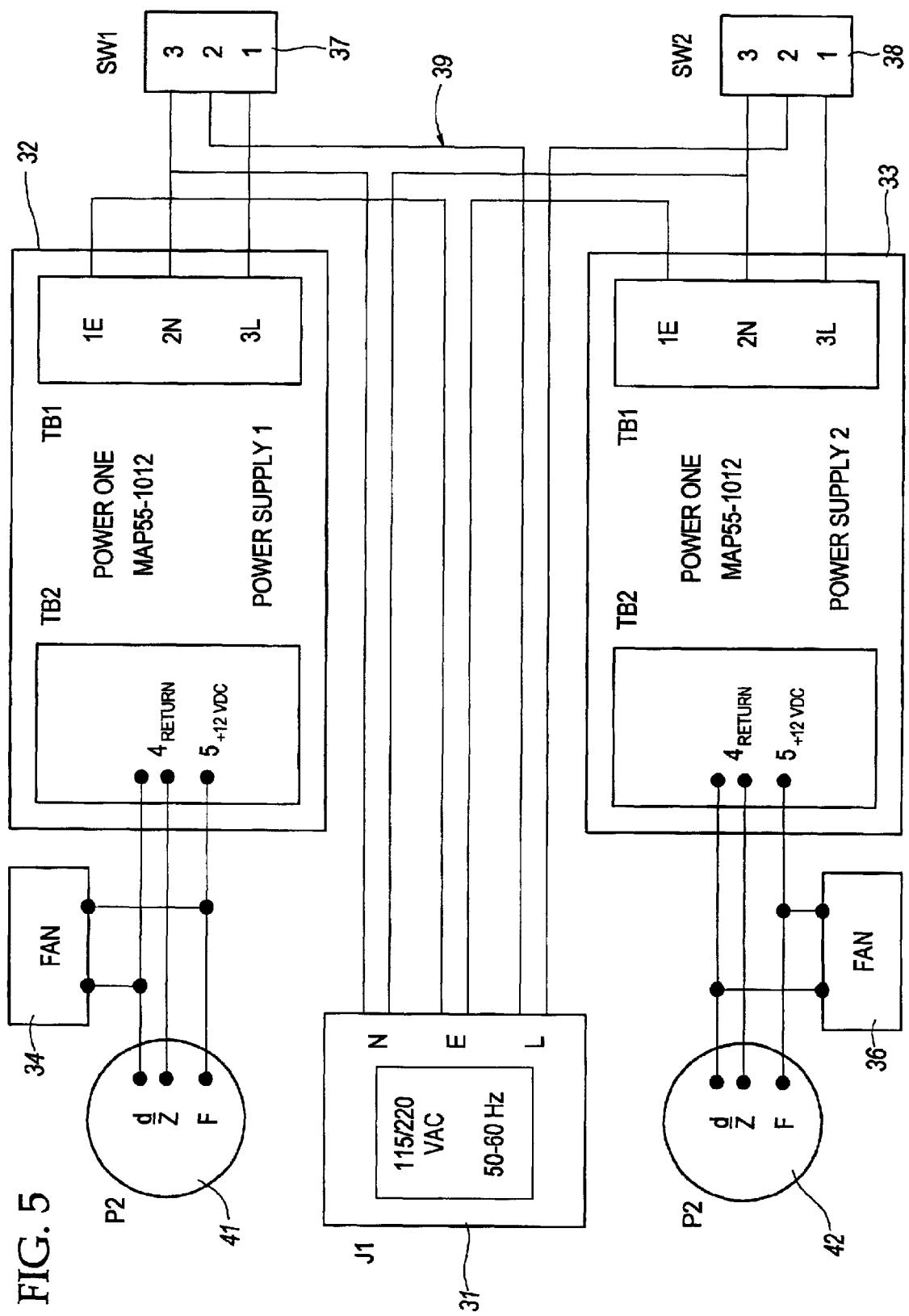
FIG. 5 is an electrical wiring diagram of the dual power supplies.

Referring now to FIG. 5 the preferred embodiment of the invention includes a dual supply configuration to convert standard household 110/220 Volt alternating current into +12 Volt direct current and supply it to installed radios via connectors 41,42. Electrical connection cord 24 supplies input power to receiving switch 31 which is connected via internal wiring 39 to front switches 37,38. A power supply 32 converts alternating current power into direct current power at voltage levels required for a SINCGARS radio and outputs the converted power to connectors 41,42 to allow for powering of two SINCGARS radio units installed or docked onto the invention. Various power supply models exist that can accomplish such electrical conversions. Fans 34,36 provide cooling for the internal power supplies and are connected to ambient external atmosphere via exhaust vents exiting on the rear of the invention (not shown), as are well known in the industry. Inasmuch as power supply conversions and power switch wiring are well-known in the electrical arts, further discussion as to the electrical characteristics and properties of the internal power supplies for converting standard 110/220 volt AC into +12 volt DC will not be discussed further as they are not necessary for a complete understanding of the invention herein described.

Figure 6:
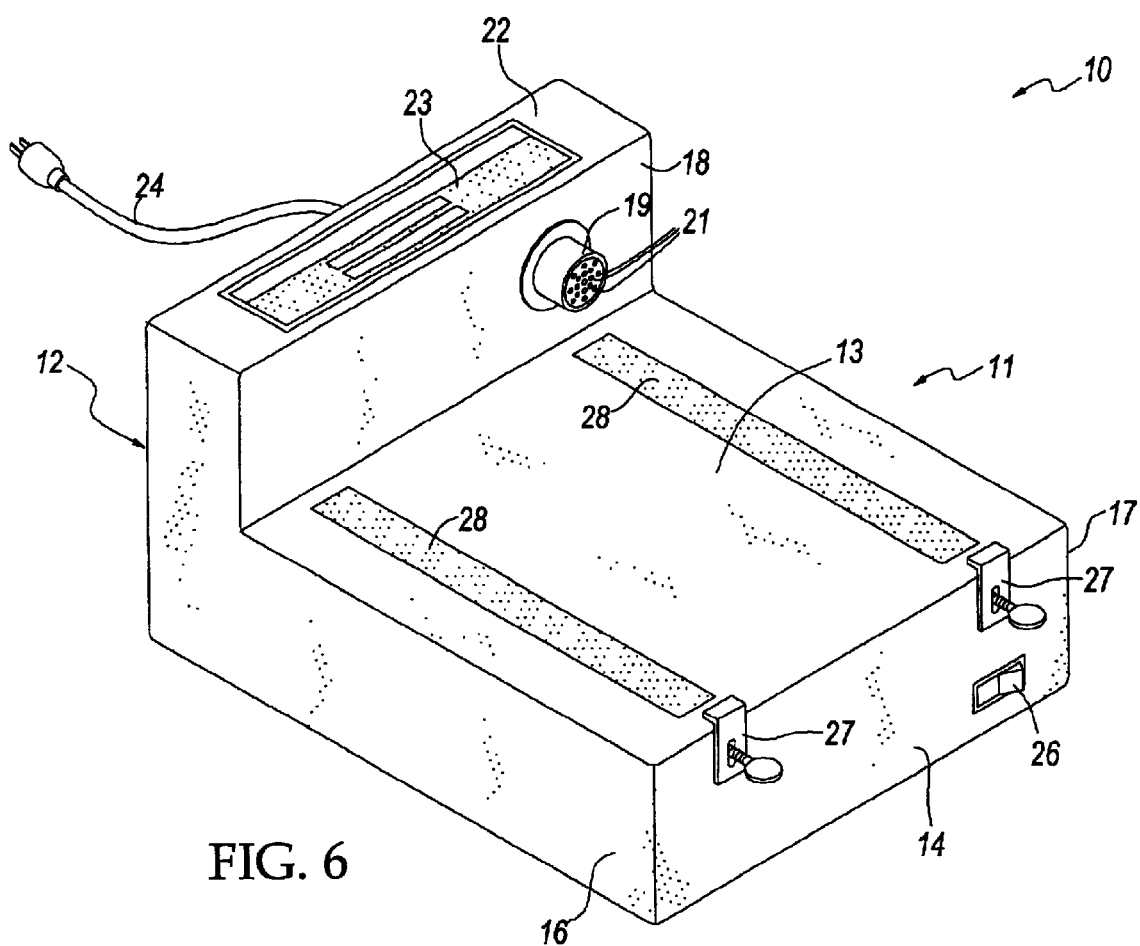
FIG. 6 is a perspective view of an alternate embodiment of the invention designed to accommodate a larger version SINCGARS radios; and, FIG. 7 is a perspective view of the preferred embodiment of the invention showing installed SINCGARS radios on the invention ready for power initiation.

Referring now to FIG. 6 an alternate embodiment is disclosed in which a larger series SINCGARS radio may be installed onto the invention to provide powering of the SINCGARS radio. In general, the invention may be sized to fit any dimension offered in SINCGARS radios. However the embodiment in FIG. 6 accommodates a larger size SINCGARS radio occupying approximately the physical space of two smaller SINCGARS radio units, but with only a single electrical socket. A single connector 19 is provided on the forward surface 18 and is positioned to align directly into a complementary socket on the docked SINCGARS radio. Other features previously discussed in FIGS. 1–4 are again present and operate in the same way as previously described in the preferred embodiment, except that only a single internal power supply and single front switch would be needed.

Figure 7:
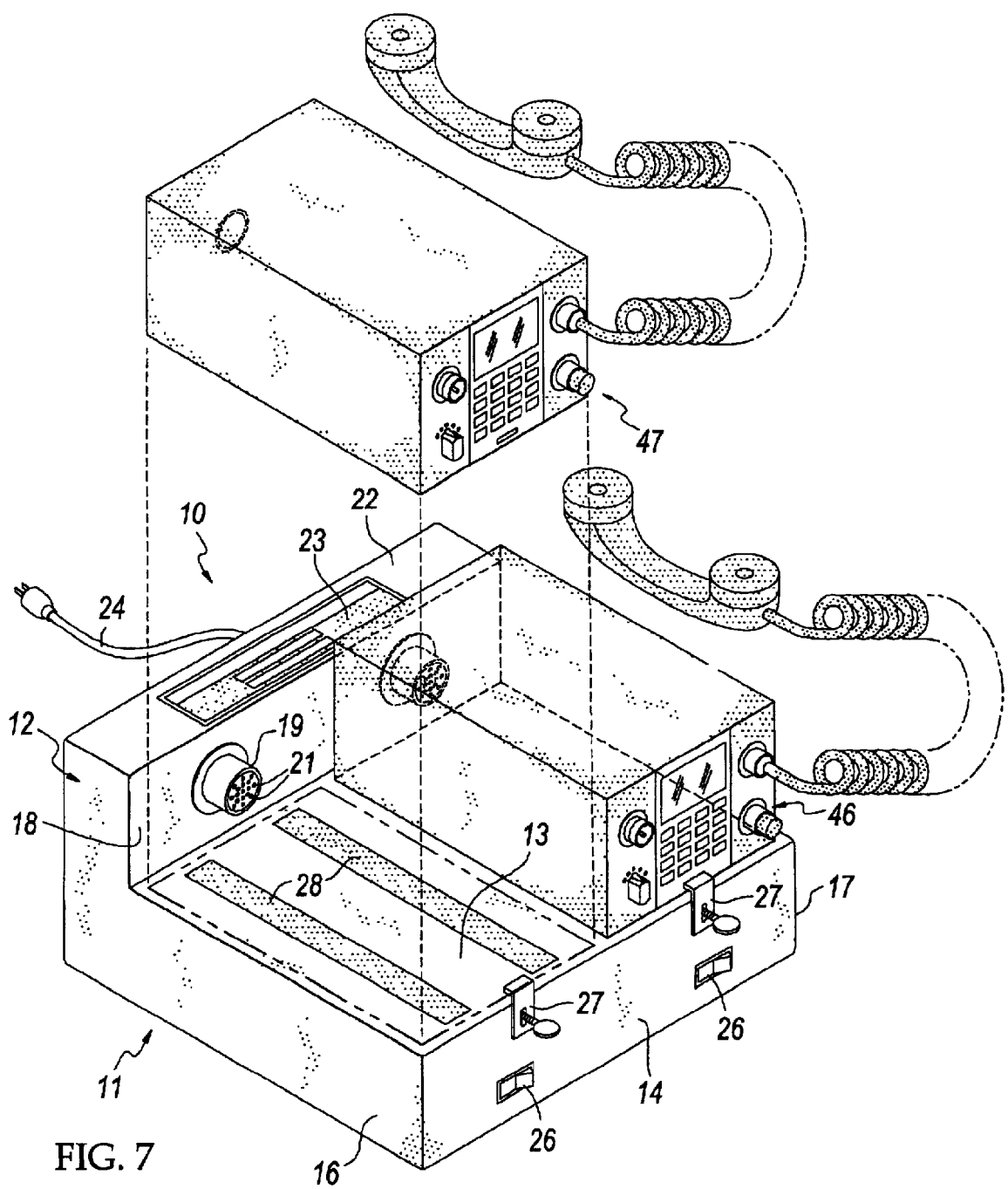

In operation, as shown in FIG. 7, the preferred embodiment is designed to simultaneously accommodate two SINCGARS radios for powering. A SINCGARS radio unit 46 is shown already installed on the invention with rear sockets engaged to provide electrical power. Latch 27 is also shown engaged into the front faceplate of the SINCGARS radio unit to securely fasten the radio onto the base platform 11. Together the rear socket engagement 19 and the front latch 27 provide locking biasing to hold the SINCGARS radio unit securely onto the base platform upper surface 13 and, in conjunction with the low friction runners 28, fully arrest any movement of the SINCGARS radio once installed onto the invention 10.

A second SINCGARS radio 47 is shown right to be installed onto the invention 10 which is simply placed adjacent to the rear connector 19 and slid slightly backward to fully engage the rear socket of the radio. Once the socket is fully engaged in the rear of the SINCGARS radio, latch 27 can then be pivoted forward and tightened via its thumb screw to securely fasten the radio onto the upper surface 13 of the platform base 11. Once one or more SINCGARS radios are installed onto the invention 10 and the invention is connected to a standard 110/220 alternating current electrical outlet, switches 26 may then be toggled to initiate current flow to the SINCGARS unit and thereby powering the unit during training and other types of military operations. Upon actuation of the switch 26, SINCGARS radios may be operated normally as though they have been provided with an infinite power supply. While look and feel of the invention 10 may vary with its mission applications, a standard military drab green color is currently anticipated for the invention to match the current nominal drab green colors of current SINCGARS radios.

While I have shown my invention in one form, it will be obvious to those skilled in the art that it is not so limited but is susceptible of various changes and modifications without departing from the spirit thereof. For example, various plug placements on the rear member of the invention as well as various types of socket structures can easily be anticipated to accommodate upgrades and modifications to the current SINCGARS radios used by the Armed Forces. Moreover, the height of the rear member and orientation of the electrical plug on the rear of the invention could easily be varied to accommodate different types of radio configurations. In general, it is contemplated that the invention would be varied in its physical dimensions to meet various types of SINCGARS radio configurations exist, such as those in existing model numbers: Ground ICOM radios using receiver-transmitter (RT) RT-1523, RT-1523A, RT-1523B, RT1523C, RT-1523D, and RT-1523E; receiver-transmitter RT-1523 series AN/VRC-87A/D/F through AN/VRC-92A/D/F, and AN/PRC-119 SINCGARS, SINCGARS ASIP.

What is claimed is:

1. An apparatus for supplying power to a SINCGARS radio, comprising:
   a. a base platform adapted and arranged for holding said SINCGARS radio, said base platform including a front side and a rear side;
   b. an integral rear portion extending upward from said rear side of said base platform;
   c. at least one electrical connector positioned on said rear portion, said at least one electrical connector adapted to fit a complementary connector on said SINCGARS radio; and
   d. a power supply contained within said base platform in electrical contact with said at least one electrical connector adapted and arranged for supplying power to said SINCGARS radio.

2. An apparatus as recited in claim 1, wherein said at least one electrical connector includes two forward facing electrical connectors, each said forward facing electrical connector adapted to fit a respective complementary connector on said SINCGARS radio.

3. An apparatus as recited in claim 2, wherein said power supply converts 110/220 alternating current into direct current.

4. An apparatus as recited in claim 3, wherein said power supply converts 110/220 alternating current into +12 volt direct current.

5. An apparatus as recited in claim 4, wherein said base platform comprises substantially a rectangle shape and wherein said rear portion rises from said rear side at a 90 degree angle.

6. An apparatus as recited in claim 5, wherein said base platform includes at least one latch positioned on said front side and adapted to engage said SINCGARS radio for holding said SINCGARS radio securely onto said base platform.

7. An apparatus as recited in claim 6, wherein said front side includes a switch for turning on said apparatus.

8. An apparatus as recited in claim 6, wherein said base platform includes low friction runners to arrest movement of an installed SINCGARS radio.

9. An apparatus as recited in claim 1, wherein said base platform comprises substantially a rectangle shape and wherein said rear portion rises from said rear side at a 90 degree angle.

10. An apparatus as recited in claim 1, wherein said power supply converts 110/220 alternating current into +12 volt direct current.

11. An apparatus as recited in claim 10, wherein said base platform includes at least one latch positioned on said front side and adapted to engage said SINCGARS radio for holding said SINCGARS radio securely onto said base platform.

12. An apparatus as recited in claim 10, wherein said base platform comprises substantially a rectangle shape and wherein said rear portion rises from said rear side at a 90 degree angle.

13. An apparatus as recited in claim 1, wherein said base platform includes low friction runners to arrest movement of an installed SINCGARS radio.

14. An apparatus as recited in claim 13, wherein said front side includes a switch for turning on said apparatus.

15. An apparatus for providing power to a SINCGARS radio, comprising:
   a. means for supporting a SINCGARS radio placed on said apparatus;
   b. an integral rear portion extending upward from said supporting means;
   c. means held by said rear portion for electrically connecting said apparatus to said SINCGARS radio; and,
   d. means positioned within said supporting means for providing electrical power to said SINCGARS radio through said electrical connecting means.

16. An apparatus as recited in claim 15, wherein said electrical power providing means converts 110/220 alternating current into direct current.

17. An apparatus as recited in claim 16, wherein said electrical connecting means comprises two electrical connecting means held by said rear portion for simultaneous powering of two SINCGARS radios.

18. An apparatus as recited in claim 17, wherein said electrical power providing means converts 110/220 alternating current into +12 volt direct current.

19. An apparatus as recited in claim 18, wherein said supporting means includes a switch positioned on a front side for turning on said apparatus.

20. An apparatus as recited in claim 19, wherein said supporting means further includes low friction runners to arrest movement of a connected SINCGARS radio.

21. An apparatus as recited in claim 20, wherein said supporting means includes means affixed thereto for locking said SINCGARS radio onto said supporting means.

22. An apparatus for supplying power to a SINCGARS radio, comprising:
   a. a base platform adapted and arranged for supporting said SINCGARS radio, said base platform including parallel front and rear sides;
   b. an integral rear portion extending upward from said rear side adapted and arranged for rearwardly supporting said SINCGARS radio, said rear portion including a front surface and a rear surface substantially perpendicular to said base platform;
   c. an electrical socket extending forward from said front surface, said electrical socket adapted to fit a complementary socket on said SINCGARS radio; and,
   d. a power supply contained within said apparatus for converting common house-hold alternating current into SINCGARS compatible direct current.

23. An apparatus as recited in claim 1 further comprising a SINCGARS radio in electrical connection with the apparatus.

24. An apparatus as recited in claim 15 further comprising a SINCGARS radio in electrical connection with the apparatus.

25. An apparatus as recited in claim 22 further comprising a SINCGARS radio in electrical connection with the apparatus.

* * * * *